Sept. 20, 1971    A. H. CARLSON    3,605,477
PRECISION FORMING OF TITANIUM ALLOYS AND THE LIKE
BY USE OF INDUCTION HEATING
Filed Feb. 2, 1968    5 Sheets-Sheet 1
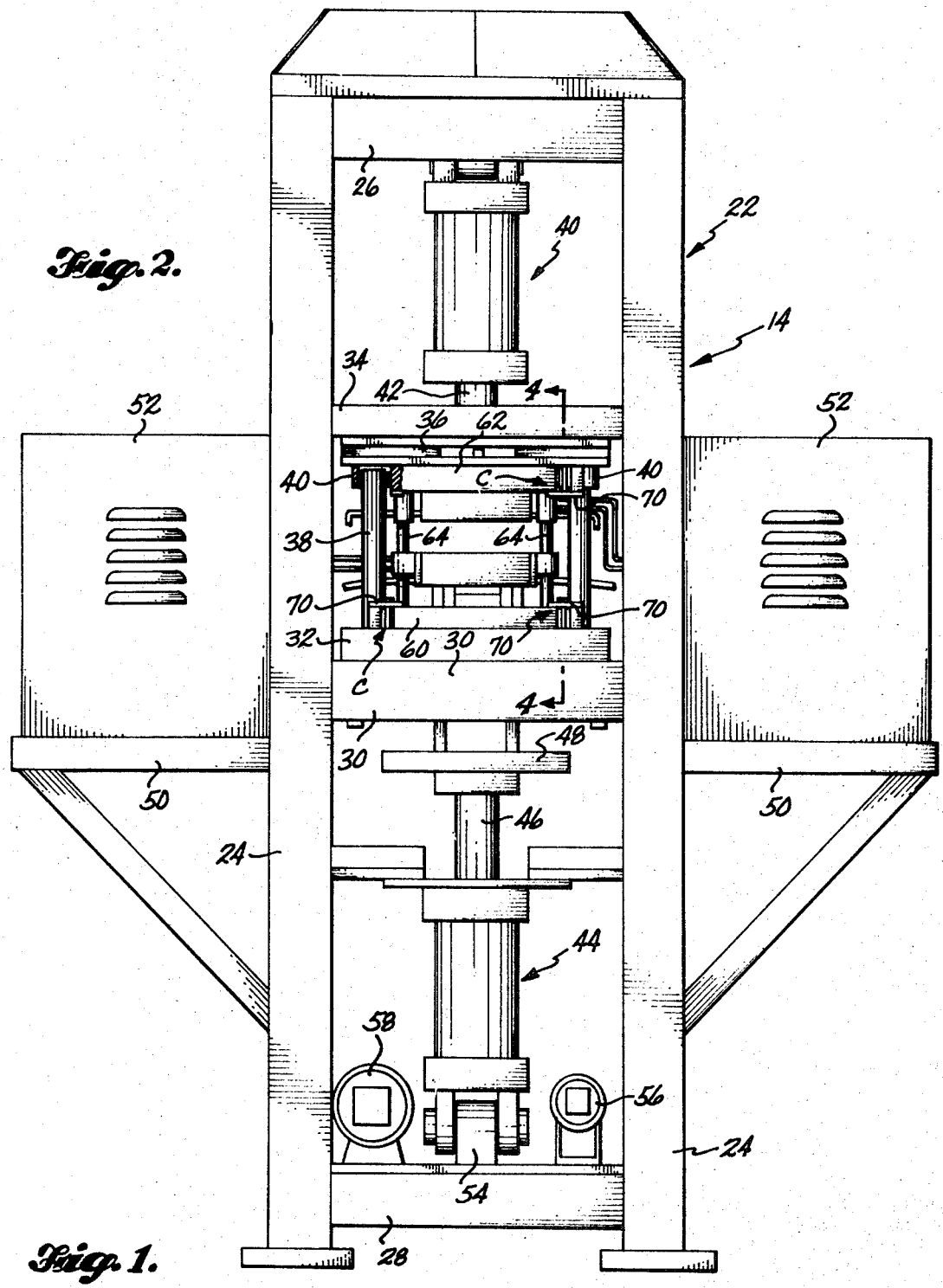
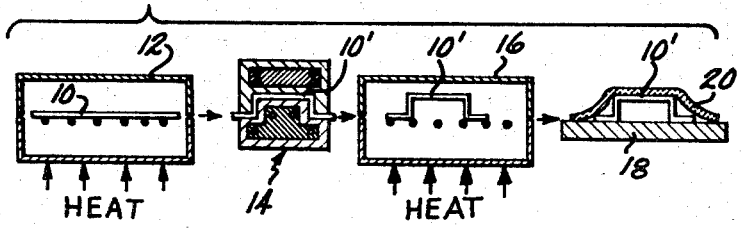
INVENTOR
ARNE H. CARLSON
BY Graybeal, Cole & Barnard
ATTORNEYS INVENTOR
ARNE H. CARLSON
BY Graybeal, Cole & Barnard
ATTORNEYS INVENTOR
ARNE H. CARLSON
BY Graybeal, Cole & Barnard
ATTORNEY

INVENTOR
ARNE H. CARLSON
ATTORNEYS

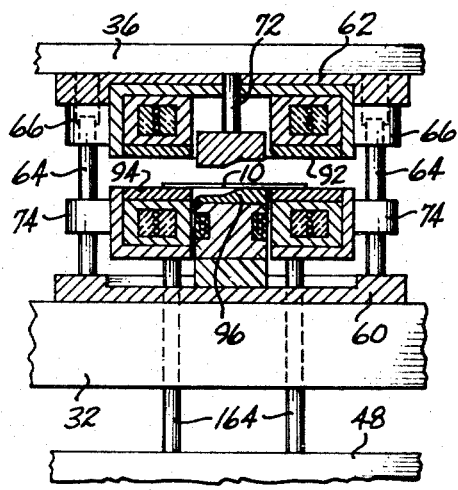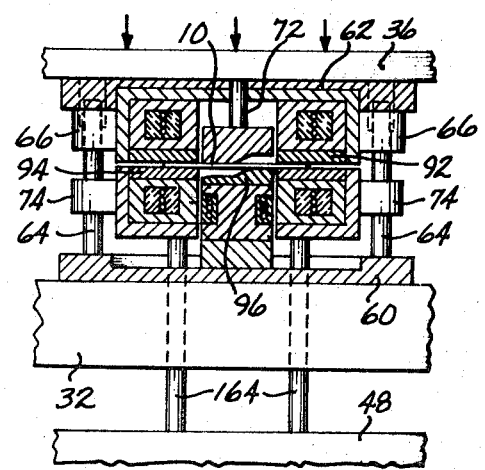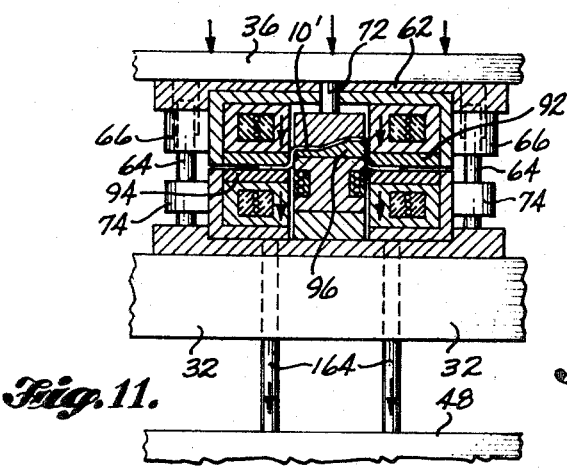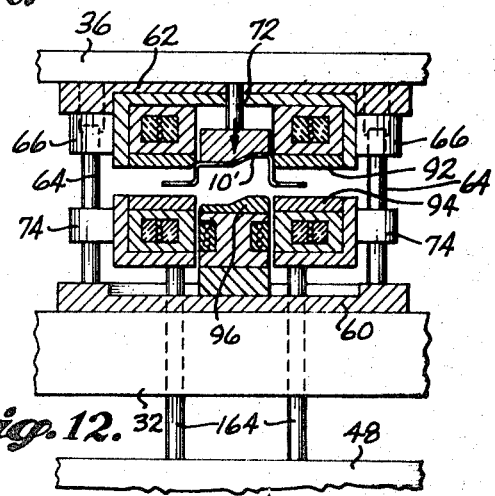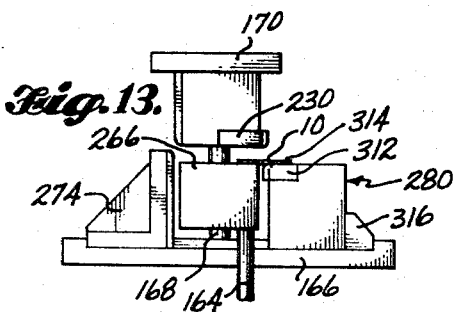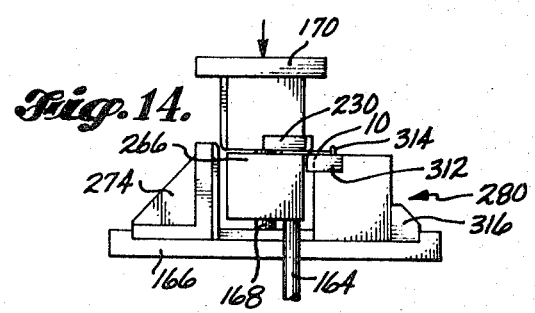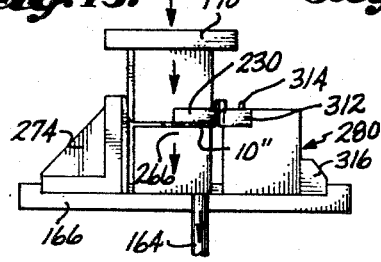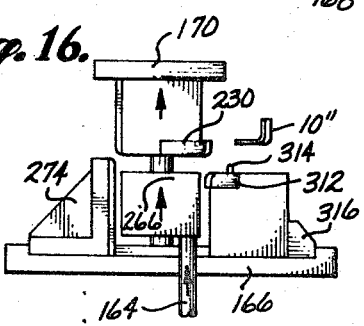

3,605,477
PRECISION FORMING OF TITANIUM ALLOYS
AND THE LIKE BY USE OF INDUCTION
HEATING
Arne H. Carlson, Seattle, Wash., assignor to Arne H.
 Carlson and S. P. Ozbolt, both of Renton, Wash.
Filed Feb. 2, 1968, Ser. No. 702,700
Int. Cl. B21d 37/16
U.S. Cl. 72—342       10 Claims

ABSTRACT OF THE DISCLOSURE

Titanium alloy blanks or the like are successively coated with a high temperature lubricant; preheated in a preheat oven to a forming temperature (about 1000–1500° F.); precision formed into a desired shape in a press which includes inductively heated forming tools, serving to maintain the metal at the forming temperature throughout the forming operation; and slowly cooled, first in a postheat oven down to a lower elevated temperature (e.g. about 600° F.) and then under cover of an asbestos blanket down to ambient temperature.

The heat forming tools include a fixed die, a movable die and a movable clamping pad. The movable tools are mounted for precision movement by leader pins and bushings. Insulation and water jackets are interposed between the heated tools and the leader pins and bushings to prevent harmful heating of the latter. The forming tools comprise water cooled tubular conductors embedded in insulative material which in turn is embedded in ferromagnetic cores, and die parts of long life metals on which the forming surfaces are machined.

BACKGROUND OF THE INVENTION

Field of the invention

This invention relates to apparatus for hot pressure forming titanium alloy blanks and the like. It particularly relates to forming equipment comprising movable forming tools which are mounted and guided for precision movement by leader pins and bushings, and to a manner of adequately heating the blanks while in the forming equipment without injuriously heating the leader pins and bushings.

Description of the prior art

Bridwell U.S. Pat. No. 3,015,292 and Haerr U.S. Pat. No. 3,025,905 both discuss the difficulties of pressure forming titanium alloy blanks. They both explain that such blanks must be heated to a relatively high temperature before they can be formed into a desired shape, and each suggests heating the blanks by means of resistance heaters incorporated in the forming equipment.

Resistance heaters are unsatisfactory for this purpose for several reasons. They experience uneven heat distribution resulting in the occurrence of hot spots and an uneven heating of the forming surfaces, causing them to warp. This results in the production of nonuniform, and in many instances inferior and unusable parts. Furthermore, high temperature resistance heaters have very short lives and must be frequently replaced. Besides being expensive, this frequent replacement of the heaters amounts to a frequent alteration of the forming equipment and is a contributing factor to a shortened life of both the replacement heating elements and the forming tool. This is because the heating element channels become enlarged somewhat during each replacement. As a result, an air space is created about at least a part of the new heater element. Since air is a poor conductor the new heater elements become overheated in use and burn out quickly. Also, the tool is not suitably heated. Replacement of the tool is necessary to correct a reoccurrence of these happenings.

Further examples of known forming machines which utilize resistance heaters are shown by: Shoebridge et al. U.S. Pat. No. 2,956,148; Swain U.S. Pat. No. 3,051,830; Scott U.S. Pat. No 3,065,331; and Kennedy U.S. Pat. No. 3,080,473. The machines disclosed by these patents are adapted for "dimpling" and other low order forming operations not involving the use, heating or precision movement of relatively large area forming tools.

Corral U.S. Pat. No. 3,060,564 and Johnson et al. U.S. Pat. No. 3,169,156 are examples of the oven and open flame types of installations for forming titanium alloys which are mentioned in the above discussed Bridwell patent.

Manson U.S. Pat. No. 1,725,465 and Von Tannenberg U.S. Pat. No. 2,247,979 disclose forming presses which utilize inductively heated dies. However, Manson is concerned with drying pulp articles, such as paper pie plates, and Von Tannenberg is concerned with forming magnesium alloy plates at temperatures of only about 320±10° C.

SUMMARY OF THE INVENTION

Basically, this invention relates to the precision forming of parts from titanium alloy blanks or the like by use of inductively heated forming tools, at least some of which are mounted and guided for precision movement by leader pins and bushings, and to the use of some sort of heat barrier means between the heated components and the leader pins and bushings, to prevent injurious heating of the latter.

According to the invention the blanks are first cleaned and are then coated with a high temperature lubricant capable of withstanding the forming temperature of the particular alloy involved (about 1000–1500° F. for most titanium alloys). Next the blanks are preheated to the forming temperature in a preheat oven containing a noncorrosive atmosphere (e.g. argon for titanium alloys which must be heated in a nitrogen free atmosphere to avoid surface contamination or corrosion of the metal). The blanks are successively removed from the preheat oven and are then placed in the forming equipment in contact only with the heated forming tools, which are at the forming temperature. Following the forming operation the formed part is removed from the forming equipment and placed into a post heat oven which also contains a non-corrosive atmosphere. During the short period between the two ovens, when the parts are exposed to the corrosive room atmosphere surrounding the equipment, they are adequately protected by the lubricant coating. To prevent severe surface cracking (i.e. checking or cracking beyond the tolerable limit) the parts are slowly cooled, first in the postheat oven down to the oven temperature which is constantly maintained at a specific level (e.g. 600° F. for some titanium alloys). Then, they are placed on an asbestos pad, or the like, are covered by an asbestos blanket, and are allowed to slowly cool down to room temperature.

Preferably, the forming equipment of this invention comprises a fixed forming tool and two movable forming tools, supported by common leader pins and their own bushings for precision movement along a path bordering the fixed forming tool. Each blank is individually placed in the equipment with a first portion thereof between the two movable tools and an adjacent second portion in position to contact the fixed forming tool. Then the two movable tools are moved relatively together to clamp and hold between them the first portion of the blank. Next, the two movable tools and the blank are moved together as an assembly relatively towards the fixed forming tool. The rate of movement is controlled so that the heated blank undergoes plastic deformation unattended by appreciable strain hardening. During this operation the lubricant coating functions as a lubricant and permit slippage of the blank laterally of the direction of press movement, within the narrow space which exists between the two movable forming tools. The blanks are permitted only this single degree of movement and are restrained against all other movement by the clamping surface of the two movable tools.

Preferably, each movable forming tool is a part of an assembly which also includes a plurality of spaced apart bushing housings containing guide bushings which surroundingly engage the leader pins, and cross frame means rigidly interconnecting said bushing housings. The leader pins are rigid members and are firmly secured to a rigid support. The bushings are precision made so they snugly engage the leader pins and are not free to wobble. The cumulative result of these features is that essentially all parts of the tool assembly always move together and each sequence of movements along the leader pins is essentially identical to each other sequence of movements. This essentially eliminates the occurrence of any nonuniformity amongst the parts as a result of changes in position and/or alignment of the forming surfaces. The bushings and the lubricants used on them cannot withstand the high forming temperatures. Accordingly, a heat barrier in the form of a body of insulative material and/or a cooling jacket is interposed between the heated components of the tool and the bushings and leader pins. In this manner the bushings and leader pins are maintained relatively cool and are protected from the injurious or destructive effects of the high temperatures existing in the region of the forming tool.

The cross frame which rigidly interconects the bushing housing supports or carries the forming tool and the heat barrier means. According to the present invention the forming tool comprises an inductively heated core unit and a hard metal die part secured to the core unit, to be conductively heated thereby. The core unit comprises a conductor coil (or plural coils) within, or encircling, a ferromagnetic core. Preferably, the coil(s) are encased in a cast body of insulation which is in turn at least partially encased by the ferromagnetic material.

The tubular conductor material, which may be copper tubing, is fashioned into a coil (or multiple coils) which in form closely approximates the shape of the forming surfaces. The magnetic core is also formed to closely conform to the shape of the forming surfaces.

Owing to this arrangement of the conductor and the magnetic core there is a substantially even distribution of electrical energy throughout the core unit. The conductor is not directly heated by the current it carries as is a resistance heater coil. However, due to its location it is susceptible of being conductively heated by the inductively heated core unit. For this reason the conductor is made tubular in form and a cooling fluid is flowed through it to remove the heat, and preferably it is also encased by insulation. This results in the conductor having relatively low operating temperature, and as a result a relatively long use life. Any uneven heating of the ferromagnetic core which might occur is buffered by a dispersion of the generated heat throughout first the core unit, and then the die part to the forming surfaces. This results in a substantially uniform or even heating of the forming surfaces and contributes greatly to the obtainment of substantially uniform parts.

Preferably, the heat barrier means includes a cooling jacket that is integrated into wall portions of the aforementioned cross frame. Preferably also, the entire forming equipment, including the leader pins and the fixed forming tool, is adapted to be placed between and clamped to the platens of a generally conventional forming press.

These and other inherent objects, features, advantages and characteristics of the present invention will be apparent from the following description of typical and therefore non-limitive embodiments of the invention, as described below in conjunction with the accompanying illustrations.

BRIEF DESCRIPTION OF THE DRAWING

In the drawing like element designations refer to like parts, and:

FIG. 1 is a diagrammatic view showing in sequence the four major operations which characterize the preferred method of this invention;

FIG. 2 is a front elevational view of a forming press equipped with draw forming equipment embodying features of the invention;

FIGS. 9–12 are four operational sequence views of the draw forming equipment of FIGS. 2–5, with FIG. 9 showing the movable forming tools spaced apart and a preheated blank between them in position for forming, with FIG. 10 showing the two movable tools moved together to clamp between them the peripheral portion of the blank, with FIG. 11 showing the two movable tools and the clamped blank in the process of being moved in unison, as an assembly, towards the stationary tool or punch, and with FIG. 12 showing the movable tools apart, the upper tool raised, and the central knockout element depressed to push out the formed part; and FIGS. 13–16 are four operational views of the forming equipment of FIGS. 7 and 8, with FIG. 13 showing the movable forming tools spaced apart and a preheated blank between them in position for forming, with FIG. 14 showing the two movable tools moved together to clamp between them a side portion of the blank, with FIG. 15 showing the two movable tools and the blank being moved towards the stationary tool or punch, and with FIG. 16 showing the two tools raised and again spaced apart and the formed part spaced outwardly to one side of the forming equipment.

DESCRIPTION OF THE PREFERRED EMBODIMENTS

Figure 3:
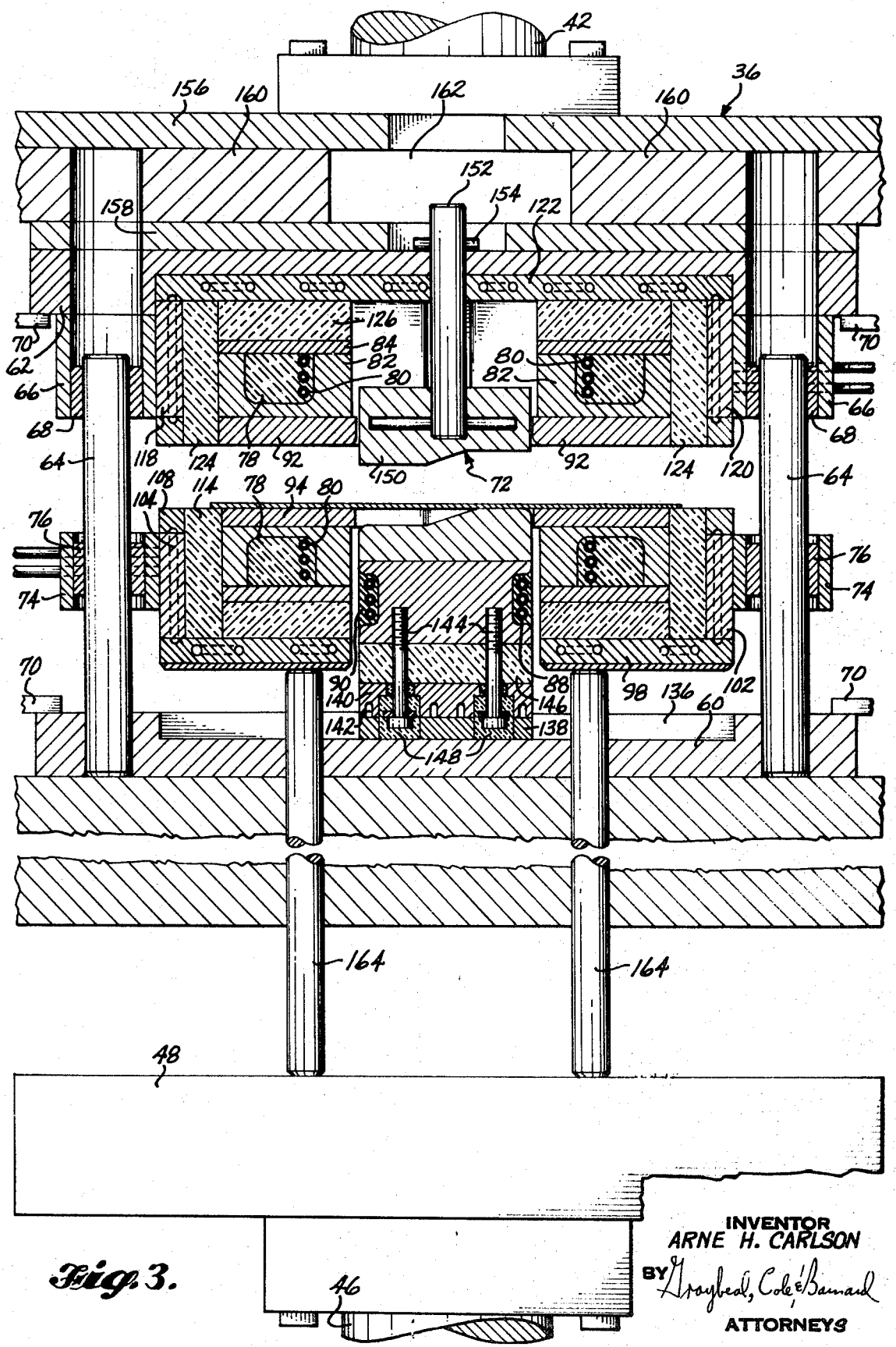
FIG. 3 is an enlarged scale sectional view, with some parts in side elevation, of the central portion of the forming press shown by FIG. 1, taken substantially along line 3—3 of FIG. 4.

As a preliminary step in the preferred process of this invention, the titanium alloy blanks 10 are deburred and polished or are otherwise suitably cleaned. They are then sprayed or otherwise coated with a suitable high temperature lubricant (i.e. a lubricant capable of withstanding the forming temperature), such as Everlube T–50, a graphite base lubricant manufactured by Everlube Corporation of America, having a place of business at North Hollywood, Calif.

Referring now to FIG. 1, following their lubrication the blanks are placed in a preheat oven 12 and are slowly heated therein up to the forming temperature, which is in the range of about 1000–1500° F. for titanium alloys. If heated to temperatures of this order in an air atmosphere, the titanium metal would attract nitrogen from the air which would chemically combine with the metal and contaminate or corrode its outer surfaces. Therefore, a non-corrosive or nitrogen free atmosphere is provided and maintained in the oven during the heating. Argon is an example of a suitable gas for use in the oven 12 to provide such an atmosphere.

The preheated blanks 10 are successively removed from the preheat oven 12 and set into the forming equipment, such as by a workman using asbestos gloves and tongs, and are then pressure formed, in a manner to be hereinafter described in some detail. The blanks 10 are then slowly cooled to prevent severe (i.e. intolerable) surface checking or cracking.

Preferably, the cooling is conducted in two stages, Firstly, the formed parts 10' are placed into a postheat oven 16 which is maintained at a specific elevated temperature between ambient temperature and the forming temperature (e.g. about 600–700° F. for titanium alloys) and also contains a non-corrosive atmosphere, such as argon, and are allowed to slowly and naturally cool in such oven 16 down to the oven temperature. The formed parts 10' are then removed from the postheat oven 16, are placed on an asbestos board or pad 18, and then are quickly covered by an asbestos blanket 20. So covered, they are allowed to slowly and naturally cool down to ambient temperature. This two stage cooling amounts to a simplified manner of slowing down the cooling process of the parts from the high forming temperature to ambient temperature, to avoid the aforementioned surface cracking which would result if rapid cooling were permitted.

During the short intervals that the heated blanks 10 are between the preheat and postheat ovens 12, 14 and the heated parts 10' are between the postheat oven 16 and the asbestos board 18, and such blanks 10 or parts 10' are exposed to air, the lubricant serves as a protective coating and protects the metal against contamination.

After cooling the parts are cleaned and trimmed and are otherwise machined to a final form.

Referring now to FIG. 2, the forming press 14 is shown to comprise a rigid main frame 22 including a set of corner columns 24 rigidly interconnected at the top by upper cross members 26 and at the bottom by lower cross members 28. Husky intermediate cross members 30 are interconnected between intermediate portions of the columns 24 and function as a support table or platform for the fixed platen 32 of the press 14. A second set of intermediate cross members 34 are located above the movable platen 36 and serve to lend rigidity to the main frame 22 at such location.

The lower end portions of a plurality of parallel, husky guide pins 38 are firmly anchored in outer portions of the fixed platen 32. The movable platen 36 carries a set of guide bushings 40 which surroundingly engage the guide pins 38.

A primary hydraulic ram 40 is suspended from a central location on the upper end portion of the frame 22 with the piston rod 42 thereof directed downwardly. The lower end of the piston rod 42 is secured to the movable platen 36. The primary ram 40 is employed to raise and lower the movable platen 36, with the guide pins 38 and the bushnigs 40 serving to maintain proper alignment of the movable platen 36 during its movement.

A secondary hydraulic ram 44 is supported below the intermediate support table 30 substantially in line with the upper ram 40. Its piston rod 46 is directed upwardly and carries at its upper end a support pad 48 of substantial area. The secondary ram 44 serves to apply a controlled biasing force on a floating portion of the forming equipment, hereinafter to be described. A support shelf 50 is bracketed out from the main frame 22 on each of its two sides and at its rear, to each support one of three transformers 52 powered by generator driven induction heaters which are apart from the machine and are not shown. In FIG. 2, which is a view looking toward the front of the machine, only the two side transformers 52 are shown. The third transformer 52 and its support shelf 50 are located to the rear of the press 14 and are thus hidden from view. The lower support table which carries the lower mounting 54 for the secondary ram 44 may also serve to mount some components of the hydraulic system, such as the hydraulic pump 56 and an electric motor 58 for driving it. Alternatively, these accessories and others may be located in a console or the like which is apart from the press 14.

Figure 4:
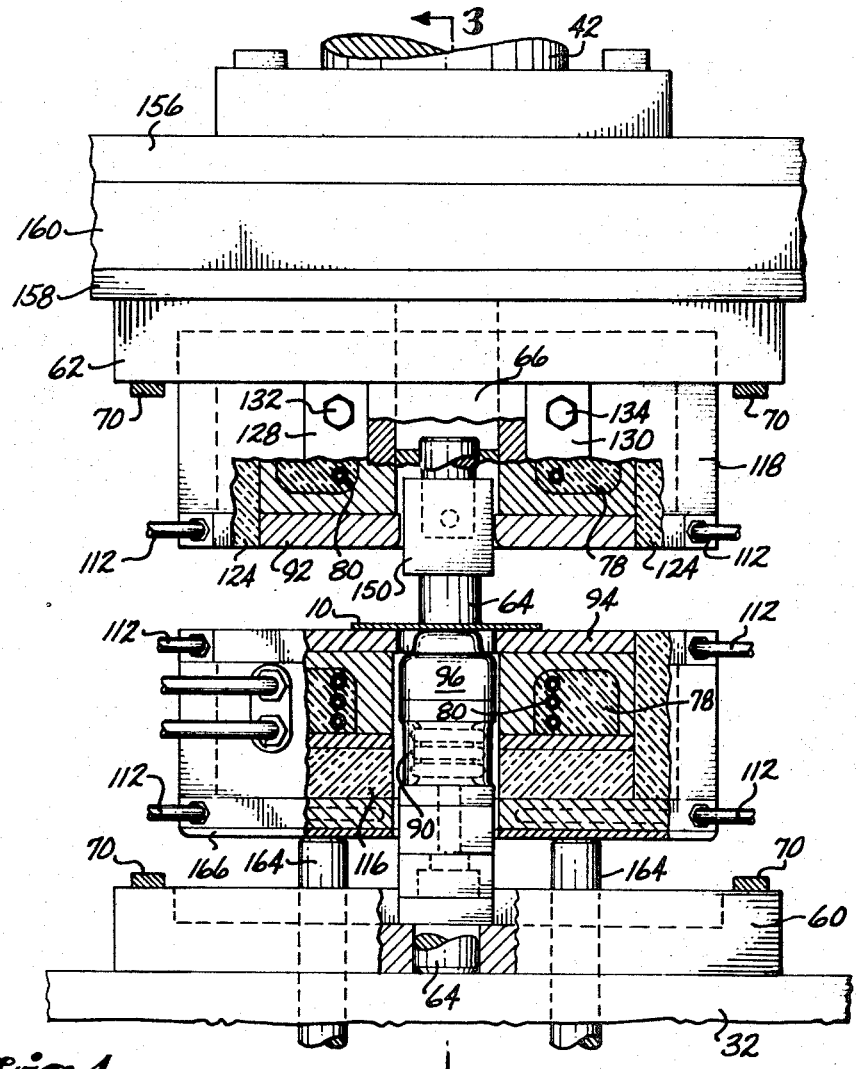
FIG. 4 is another enlarged scale sectional view, with some parts in side elevation, of said central portion of the forming press shown by FIG. 1, but taken substantially along line 4—4 of FIG. 1.
Figure 5:
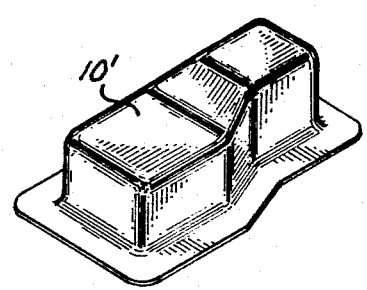
FIG. 5 is an isometric view of a part formed by the draw forming equipment of FIGS. 2–4.
Figure 7:
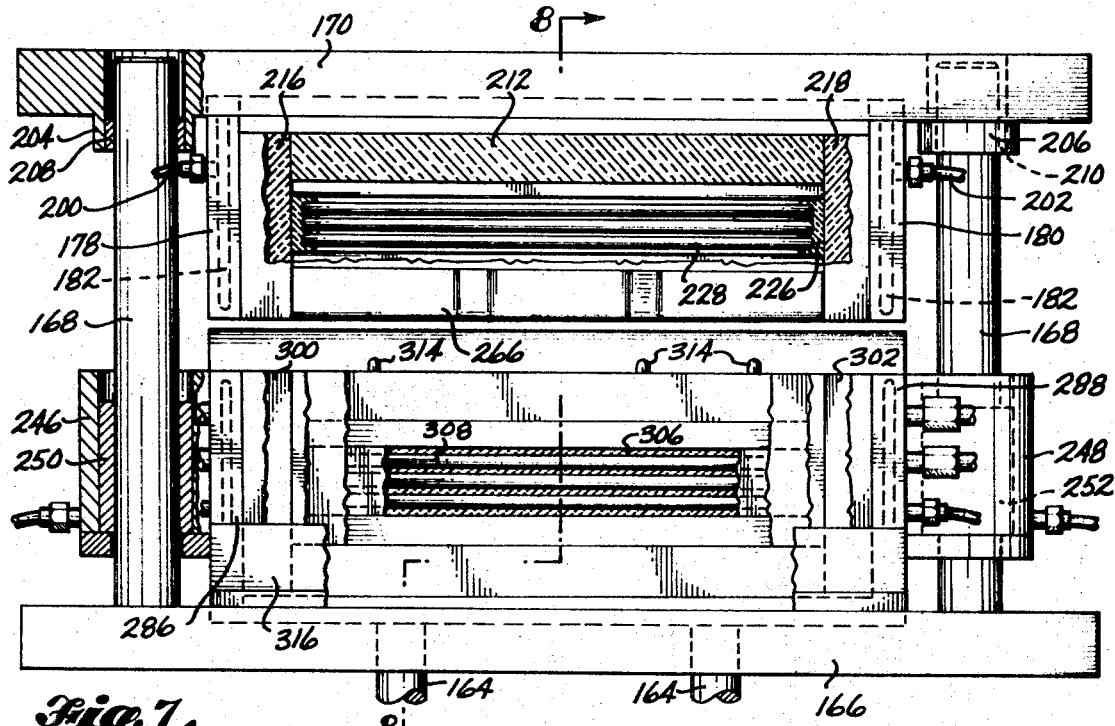
FIG. 7 is a view similar to FIG. 3, but of a press equipped with "wipe" forming equipment.
Figure 8:
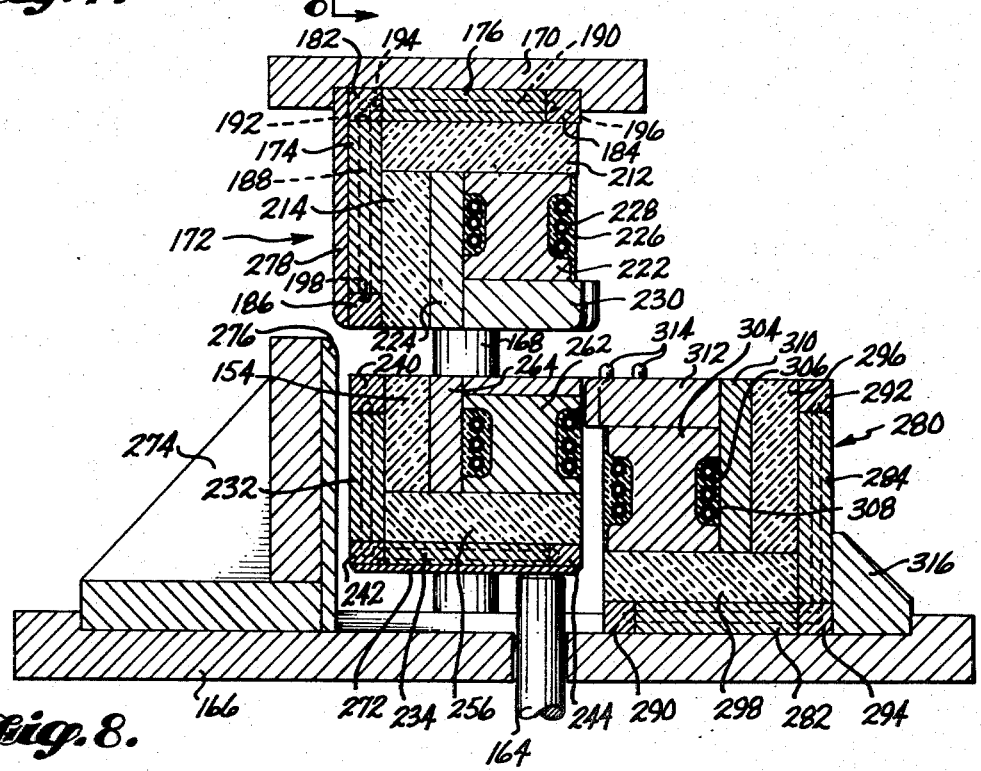
FIG. 8 is a vertical sectional view taken substantially along line 8—8 of FIG. 7.

The precision forming equipment of the present invention will now be described. The particular forming equipment shown by FIGS. 3 and 4 is of the draw forming type while the forming equipment shown by FIGS. 7 and 8 is of the "wipe" forming type. However, as will be evident as the description of these two types of equipment progress, both types are basically similar.

Referring now to FIGS. 3 and 4, the forming equipment is shown to comprise a die set composed of a lower or fixed bolster plate 60, an upper or movable bolster plate 62, and a pair of leader pins 64. The two bolster plates 60, 62 may be fabricated from an aluminum alloy and the leader pin 64 may be fabricated from stainless steel. A pair of sockets are formed in outer edge portions of the lower bolster plate 60 to receive the lower end portions of the leader pins 64. The lower end portions of the leader pins 64 are tightly received in such sockets so that the leader pins 64 are firmly held in parallelism. Bearing sleeves or housings 66, carried by the movable bolster plate 62, house bronze bushings 68, or the like which snugly surroundingly engage the leader pnis 64.

The upper bolster plate 62 is in some manner removably secured to the movable platen 36 and the lower bolster plate 60 is in a like manner secured to the fixed platen 32. By way of typical and therefore nonlimitive example, the bolster plates may be secured to the platens by clamp assemblies C which are carried by the latter and include clamping plates 70 shown in FIGS. 2–4 to overlap border portions of the bolster plates 60, 62. The die set, i.e. the two bolster plates 60, 62 and the leader pins 64, constitute the support portion of the forming equipment, making such equipment structurally self contanied. This feature, plus the use of the clamps for removably securing the bolster plates to the platens of the press, makes it easy to selectively use a number of different forming equipment assemblies, each possessing similar bolster plates, within a single press.

The draw forming equipment of FIGS. 3 and 4 comprises two movable tools and one fixed tool, each of which is inductively heated as will hereinafter be explained in detail, and may include a knockout punch 72. One of the movable forming tools is a cavity die and is mounted on or supported by the upper bolster plate 62. The second movable forming tool is a part of a "floating" assembly mounted between the two bolster plates 60, 62 for precision movement along the leader pins 64. The fixed forming member is in the nature of a forming punch and is mounted on a central portion of the lower bolster plate 60.

For the purpose of better describing the forming equipment in a manner showing the similarities which exist between the various components, the equipment will be described as being made up of three major components consisting of two movable tool assemblies and a fixed tool assembly. The bushing housings 66, the bushings 68 therein, the structural portions of the bolster plate 62 which rigidly interconnect the bushing housings 66, and the various components of the cavity die tool, including some yet to be described heating and heat barrier means associated therewith, together constitute the first movable tool assembly. The second movable tool assembly is the "floating" assembly. It comprises a pair of bushing sleeves 74 containing bronze bushings 76 which snugly surroundingly engage the leader pins 64, a rigid structural portion or cross frame which spans between the leader pins 64 and rigidly interconnects the bushing housings 74, the forming tool itself, and the heat barrier means associated therewith. The three forming tools will now be specifically described in detail.

Each forming tool comprises an inductively heated core unit. The core units of the two movably are basically alike and will be described together. Each comprises a ferromagnetic core 82 of annular channel form, and an electrical conductor coil 80 embedded in a body 78 of cast insulation which fills the channel. An annular plate 84 spans across and covers the open side of the channel 82.

The core unit of the fixed forming tool comprises a block or body 86 which includes a girth channel for receiving a conductor coil 88 and a body 90 of cast insulative material in which such coil 88 is embedded. Hard metal die parts 92, 94, 96 are secured to the ferromagnetic cores to be at least primarily conductively heated thereby. It is necssary that these parts be made of a metal capable of maintaining a hard wear surface at elevated temperatures. Examples of such metals are stainless steel 321, stainless steel 347, Hasteloy X, Inconel 750 and Inconel 820, each of which is a nonmagnetic material.

The lower surface of die part 92 and the upper surface of die part 94 are parallel and function as clamping or gripping surfaces. The surfaces of the die part 92 which immediately border and define the central opening in such part, and the upper and side surfaces of the die part 96 are of complementary design and function to form or give shape to the blanks 10.

Each one of the transformers 52 is associated with, and its output is connected to, a particular one of the three conductor coils 80, 80, 88. The coils 80, 80, 88 and the associated magnetic cores 82, 82, 86 are fashioned to closely approximate in form the shape of the finished part. The electrical energy conducted to the conductor coils 80, 80, 88 by the transformers does not directly heat such coils, as in the case of resistance heater elements, but rather inductively heats the magnetic cores 82, 82, 86. Since the conductors 80, 80, 88 are closely adjacent the conductively heated cores 82, 82, 86, they are susceptible to being heated by the conduction of heat back from such cores. The conductors 80, 80, 88 are protected from such heating to some extent by the insulative material in which they are embedded. However, the conductors 80, 80, 88 are also made of tubular form and a cooling liquid, e.g. water, is flowed through them for removing the heat which does reach the conductors 80, 80, 88.

As will be evident, the generated heat will be dispersed by conduction throughout the four magnetic cores 82, 82, 86 before being transferred by conduction to the die parts 92, 94, 96, contributing to an even or uniform heating of such parts and the forming surfaces they carry.

As earlier explained, the bushings 68, 76 which are key elements to the obtainment of a large number of uniform parts throughout a long operational life of the forming equipment must be operated at relatively low temperatures. Otherwise the lubricant they employ, and the bushing material itself, will suffer injurious or destructive effects. According to the present invention, a heat barrier is provided to substantially surround the heated zone, so as to isolate such zone and localize the heat only where it is desired, while protecting the surrounding parts of the forming equipment, especially in the region of the bushings, from being excessively heated.

In the preferred embodiment the heat barrier means for each tool assembly comprises both a thickness of insulative material and a coolant jacket containing passageways through which a cooling fluid is flowed. As best shown by FIG. 3, each movable tool assembly may comprise a box-like structure formed by four side walls and a top or bottom wall, each drilled to include a plurality of passageways for receiving the flowing cooling fluid. The box-like water jacket of the floating tool assembly is the rigid cross frame which rigidly interconnects or integrates the two bushing housings 74. It comprises a bottom plate or wall 98 and four side plates or walls, two of which are shown and are designated 100, 102, respectively. By way of example, plurality of parallel, vertical passageways 104 are drilled in side plate 100. Short grooves 106 are formed in the upper surface of the bottom plate 98 in position to interconnect the lower ends of the first and second passageways 100, the third and fourth passageways, and so on. A bar shaped cap member 108 is secured to the upper edge of plate 100. It is formed to include short grooves 110 in its lower surface which interconnect the upper ends of the second and third passageways 100, the fourth and fifth passageways, and so on. This basic construction, including the use of cap members where needed, is found throughout the cooling jackets of both movable tool assemblies. Copper tubing conduits 112, or the like, may be connected to corner portions of the cross plates, or to corner portions of the cap members, as shown by FIG. 4, to serve as supply and discharge conduits for the cooling fluid.

A wall or plank of insulation 114 is situated immediately inwardly of each side wall of the box-like cross frame, and a centrally apertured wall 116 is interposed between the plate 84 and the bottom wall 98. These walls 114, 116 may be fashioned from a board type insulation, such as the ceramic fiber of alumina and silica board made by the Carborundum Company and sold under the name Fiberfrax, for example.

The water jacket of the upper movable forming tool is also shown to be a box-like form and to include four side walls, two of which are designated 118, 120, in FIG. 3, and a top wall 122. A wall or plank of insulation 124 is provided immediately inwardly of each side wall, and a centrally apertured plank 126 is provided immediately inwardly of the top plate 122.

The upper bolster plate 62 is shown to include a downwardly opening central recess in which the water jacket plate 122 and an upper portion of the side plates of the water jacket are snugly received. Preferably, as in the case of thhe floating tool assembly, the side walls and the top wal forming the water jacket are rigidly secured together to form a box-like cross frame which rigidly interconnects the bearing housings 66. The bearing housings 66 may include side mounting portions 128, 130 which are apertured to receive bolts 132, 134 used for securing the housing or sleeve 66 to the side walls (e.g. wall 118 in FIG. 4).

Referring again to FIG. 3, the lower bolster plate 60 may also include a central recess 136 shaped to snugly receive the lower portion of the floating tool assembly when it is in its lowermost position. A metallic base plate 138 is shown secured to the central portion of the bolster plate 60, and a grooved plate 140 is shown positioned on the plate 138. The plates 138, 140 together form a cooling jacket for the fixed forming tool assembly. Inlet and outlet means (not shown) are provided for delivering a cooling fluid (e.g. water) through the passageways 142. A plank 146 of an insulative material is interposed between the plate 140 and the ferromagnetic core 86. Anchor bolts 144 are provided for securing together coolant jacket plates 138, 140, the insulation 146 and the ferromagnetic core 86. Enlarged wells are formed in the plates 138, 140 around the headed portions of the bolts 144, and a castable insulation, such as a castable form of the aforementioned Fiberfrax, for example, is introduced in such recesses to surround the headed portions of the bolts to form insulation plugs 148. Washers may be provided immediately inwardly of the bolt heads to better anchor the bolts in the plugs 148. The insulation plugs 148 prevent, or at least minimize, heat conduction from the ferromagnetic core 86 into the boltster plate 60.

The knockout punch or tool 72 is shown to comprise a head 150 and a shank 152. Openings for the shank are provided through the water jacket plate 122 and the upper bolster plate 62. A cross pin 154, or the like, may be provided for limiting the extent of downward movement of the shank 152, and hence the knockout tool 72 itself. The upper platen 36 of the press 14 is shown to be composed of a top plate 156 spaced above a lower plate 158 by spacer blocks or plates 160 arranged to provide a central recess 162 in the upper platen 136 about the upper end of the shank 152. A side tunnel is provided so that a hand tool may be inserted into the recess 162 and used to depress and operate the knockout tool.

Two or more sets of bores are provided through the lower bolster plate 60 and the lower platen 32, in parallelism with the guide or leader pins 64, to each receive a support pin 164 which rests at its upper end against the lower surface of the floating tool assembly and at its lower end against the upper surface of the support pad 48. It is through the intermediacies of the support pins 164 that the secondary ram 44 exerts a biasing force on the floating tool assembly. A wear plate 166 of stainless steel or some other hard and durable metal may be provided on the under side of the floating tool assembly to be the part thereof that is immediately contacted by the pins 164.

As should be apparent by now, the isolation of the generated heat by the insulation 114, 116, 124, 126, 146 into the central region of the forming equipment, and the removal of such heat from such central region by means of the coolant jackets 98, 100, 102, 118, 122, 124, 140, is what makes possible the use of the leader pins 64 and the bushings 68, 76 for accurately guiding the two movable forming tools. A further advantageous result of the use and particular placement of the insulation is that it reduces the amount of exposed surface on each of the ferromagnetic cores, and thus reduces the amount of oxidation that takes place on the cores during heating.

In operation, the preheated, lubricated blank 10 is placed in the forming equipment between the two movable forming tools (FIG. 9). Hydraulic fluid is then admitted to the secondary ram 44 to cause it, through the intermediacy of the support pins 164, to raise the floating tool assembly. Fluid is also delivered into the main ram 40 to cause a lowering of the upper platen 36, and the upper forming tool carried thereby. A larger force is intentionally developed by the main ram 40 so that it will override the secondary ram 44, causing the two movable forming tools and the blank 10 clamped between them to be moved downwardly towards the punch. The force differential is regulated so that a sufficient holding pressure is maintained between the holding surfaces of the plates 92, 94 and the portion of the blank 10 sandwiched between them. Preferably, the two rams 40, 44 are conjunctively operated by maintaining a constant fluid pressure in the cylinder of the upper ram 40 above the piston therein, while slowly bleeding fluid from below such piston. At the same time, a constant pressure is maintained in the cylinder of the lower ram 44, below the piston therein, while the space above such piston is vented. The force differential which causes downward movement of the movable tools and the blank is regulated by such bleeding of fluid from below the upper piston. This arrangement results in a substantially jerk-free downward movement of the blank 10. The pressure developed between the holding surfaces of the plates 92, 94 is sufficient to prevent wrinkling, but insufficient to prevent the blank aided by the lubricant coating from sliding sideways of the press at the part is being formed. Downward movement of the blank (i.e. the bleeding rate) is carefully controlled so that plastic deformation of the blank 10 occurs unattended by any appreciable strain hardening thereof.

If for any reason it becomes necessary to look at the part being formed prior to completion thereof, bleeding of fluid from the upper cylinder is ceased and the upper ram 40 is reversed to lift the upper platen 36 and the die assembly carried thereby. Then, when it is desired to resume the forming process, fluid flow to the upper ram 40 is again reversed to cause a lowering of the platen 36 and the die assembly. Once the die assembly is back in mating engagement with the partially formed part, bleeding of fluid from below the upper piston is once again started and continued until the part is fully formed (FIG. 11).

Following forming of the part 10' the two movable tools are raised until the support pad is in the position shown by FIG. 12, and the upper platen and the die assembly carried thereby are by themselves raised an additional amount. Next, the knockout tool 72 is depressed, such as by means of a hand tool introduced through the side tunnel into the recess 162, as earlier explained. The part is then ready to be grasped by means of a pair of tongs and moved to the postheat oven 16 for cooling, as earlier explained.

In FIGS. 9–12 the insulation blankets have been omitted and the coolant jackets have not been detailed, for simplicity of illustration.

Figure 6:
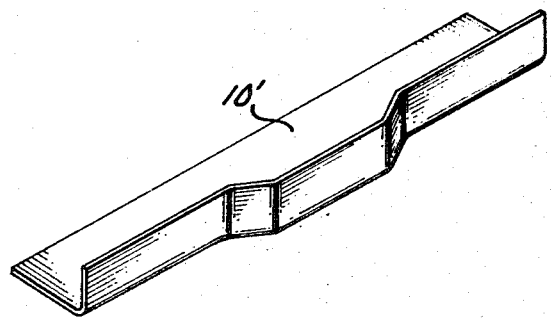
FIG. 6 is an isometric view of a part formed by the forming equipment of FIGS. 7 and 8.

FIGS. 7 and 8 relate to a modified form of forming equipment which is adapted for forming a part 10" of the type shown by FIG. 6. Such equipment includes a lower fixed bolster plate 166, a pair of leader pins 168 extending upwardly therefrom, and an upper movable bolster plate 170. The upper bolster plate 170 carries a movable forming tool or die 172, shown to comprise a metallic cross frame which also serves as a coolant jacket. Such cross frame is shown to include a rear wall 174, a top wall 176, and end walls 178, 180. The walls 172, 178, 180 are formed to include a plurality of relatively closely spaced vertical passageways 188, and the top panel 176 is formed to include a plurality of closely spaced horizontal passageways 190. As in the earlier embodiment, cap members 182, 184, 186 are provided to border the longitudinal edges of the plates 174, 176. The corner cap member 182 may be provided with intersecting bores 192, 194 which together form a right angled passageway for interconnecting the upper ends of passageways 188 with the adjacent ends of passageways 190. Cap member 184 includes a plurality of short grooves 196 which serve to interconnect the opposite ends of the passageways 190 in a pattern of pairs. Similarly, cap member 186 includes a plurality of short grooves 198 which serve to interconnect the lower ends of the passageways 188 in groups of pairs. An inlet 200 may be provided in end wall 178 and an outlet 202 in end wall 180, to complete with the various passageways and grooves a continuous flow path for the coolant (e.g. water) through the coolant jacket.

In this embodiment the bolster plate 170 is shown to include integrally formed bushing housings 204, 206 which include bushings 208, 210 serving to mount the bolster plate 170 and the forming tool carried thereby for precision movement up and down along the leader pins 168. Thus, in this embodiment it is the bolster plate 170 itself which constitutes the cross frame means which rigidly interconnects the bushing housings 204, 206.

A plank of board insulation 212 is situated immediately below the top plate 176, and a smaller board of insulation 214 is positioned immediately inwardly of the portion of plate 176 which extends below the lower surface of plank 212. Similarly, planks 216, 218 of insulation are provided at the two ends of the assembly immediately inwardly of the end walls 178, 180.

The forming tool 220 itself is located within a generally square cornered nook bounded on top by the insulation plank 212, at the rear by insulation plank 214 and at the ends by insulation planks 216, 218. Such tool is shown to comprise a ferromagnetic core assembly composed of a main body 222 about which has been formed a girth channel, and a rear plate 224 positioned between the body 222 and the insulation 214. The girth channel is filled with insulative material, which is preferably cast in place. A coil 228 of copper tubing or some other suitable tubular conductor material is embedded within the insulation 226. A hard metal die part 230 is secured to the ferromagnetic body 222 and the ferromagnetic plate 224.

The second or "floating" movable tool assembly is basically similar to the just described tool assembly. Hence, it will not be described in as great a detail. It comprises a coolant jacket composed of a rear wall 232, a lower wall 234, end walls 236, 238, and edge caps 240, 242, 244. In such assembly, the bearing housings or sleeves 246, 248 (FIG. 7) are secured to the end walls 236, 238, and the coolant jacket serves as a cross frame which structurally interconnects the two housings 246, 248. In FIG. 7, the bushing 250 in housing 246 is shown in section, whereas the bushing 252 in the opposite housing 248 merely has its position indicated by broken or hidden lines.

The insulation jacket of the "floating" tool assembly comprises a rear plank 254, a lower plank 256, and end planks 258, 260. The tool itself includes a ferromagnetic body 262 formed to include a girth channel, a ferromagnetic member 264 interposed between plank 254 and body 262, and a die part 266. The girth channel is filled with insulation 268 in which is embedded a conductor coil 270.

A hard metal wear plate 272 may be provided below coolant jacket member 234 to serve as a contact plate for the support pins 164.

In FIG. 8 a guide bracket 274 is shown positioned to the rear of the path of movement of the two movable tool assemblies. It is shown to include a wear plate 276 of a hard metal which in use is contacted by a similar plate 278 provided to the rear of coolant jacket member 174 of the upper movable tool assembly.

The equipment also comprises a fixed forming tool or die 280 which is similar in basic construction to the two movable tools. It includes a coolant jacket formed by a bottom plate 282, a front plate 284, end plates 286, 288, and cap members 290, 292, 294. Passageways are provided in the parts 282, 284, 286, 288 and grooves in the parts 290, 292 to all together form a continuous passageway for a flowing coolant. Such assembly also includes an insulation jacket composed of a front plank 296, a lower plank 298, and two end planks 300, 302. The tool itself comprises a ferromagnetic body 304 which like the bodies 222, 262 includes a girth channel for receiving insulative material 306 in which is embedded a coil 308 of copper tubing or some other suitable tubular conductor. A ferromagnetic plate 310 is interposed between the body 304 and the insulation plank 296, and a hard metal die part 312 is secured to the top of body 304.

Die parts 230, 312 carry complementary forming surfaces. Locator pins 314 are carried by die part 312. Die part 266 serves primarily as a holding member.

In operation of the forming equipment shown by FIGS. 7 and 8, the blanks 10 are successively placed on the upper surface of die part 266 and in contact with the locating pins 314 (see FIG. 13). The two rams 40, 44 of the press 14 are operated as in the operation of the first embodiment to first cause a clamping of the blank 10 between the clamping surfaces of the die parts 230, 266, and then a downward movement of the two movable tool assemblies relative to the fixed tool assembly. As before, care is taken to see that the heated blank (e.g. to temperature of 1,000–1,500° F.) is slowly moved relative to the fixed forming tool. The action desired is a "wiping" action in which the metal is slowly moved and reformed to cause a plastic deformation unattended by any appreciable strain hardening.

A heel block 316 is positioned forwardly of the fixed tool assembly and serves to support and prevent a forward movement of the fixed tool assembly during the forming operation. At the rear of the equipment, the tight engagement made between the wear plates 276, 278 braces the two movable tool assemblies against an unwanted turning movement as a result of the forces imposed on them during the forming operation.

While various forms of forming equipment embodying principles of the invention and a preferred method have been described, it is to be understood that changes in construction and technique may be made without departing from the principles of the invention. Accordingly, the scope of the invention is to be determined solely by the scope and proper interpretation of the following claims.

What is claimed is:

1. A hot forming tool assembly comprising:
   a plurality of spaced apart bushing housings containing guide bushings which in use surroundingly engage leader pins and serve to mount the tool assembly for precision travel along said leader pins;
   support means rigidly interconnecting said bushing housings;
   a forming tool carried by said support means comprising an inductively heatable mass, a die part on said mass, and an induction heating coil surrounding a portion of said mass, with said induction heating coil in use inductively heating said mass, and with said mass and its die part conductively heating material to be formed which is in contact with the die part; and
   heat barrier means on said support means interposed between said forming tool and said bushing housings, for protecting said bushings against heat from said mass.

2. The forming tool assembly of claim 1, wherein said induction heating coil comprises electrical conductors of tubular form, so that a cooling fluid can be flowed through them, and wherein said assembly further comprises means for delivering a cooling fluid into said conductors.

3. The forming tool assemby of claim 1, wherein said heat barrier means includes a coolant jacket containing passageways through which a cooling fluid may be flowed.

4. The forming tool assembly of claim 1, wherein said support means comprises rigid wall means including passageways for receiving a flowing cooling medium, said wall means constituting at least a part of said heat barrier means.

5. The forming tool assembly of claim 1, wherein said heat barrier means comprises insulating material interposed between said support means and said forming tool.

6. The forming tool assembly of claim 1, wherein said support means comprises side wall means immediately inwardly of the bushing housings, and said heat barrier means comprises insulative material interposed between said side wall means and the forming tool.

7. The forming tool assembly of claim 6, wherein said bushing housings comprise sleeve member rigidly secured to said side wall means.

8. A sheet metal forming tool assembly comprising:
   a tool support;
   a forming tool carried by said support and comprising an inductively heatable mass, a die part on said mass, a tubular induction heating coil surrounding a portion of said mass in spaced relationship therewith, and a body of insulative material embedding said coil and also occupying the space between the coil and said mass, said insulative material permitting expansion and contraction of the coil;
   means for supplying electrical energy to said coil; and
   means for delivering a cooling fluid into and through said coil.

9. A sheet metal forming tool assembly according to claim 8, wherein said forming tool is a punch having the die part at an end thereof, a surrounding channel is formed in the tool mass and said induction heating coil and said embedding insulative material are inside said channel.

10. A sheet metal forming tool assembly according to claim 8, wherein a body of insulative material capable of withstanding the compressive forces exerted by the forming tool during the forming operation is interposed in a load transferring relationship between said mass and the tool support, and wherein a cooling fluid passageway is interposed in load transferring relationship between said mass and the tool support and adjacent said insulative material, and means for directing a cooling fluid into said cooling fluid passageway during the forming operation.

References Cited

UNITED STATES PATENTS

| | | | |
|---|---|---|---|
| 2,698,267 | 12/1954 | Halversen | 148—11.5 |
| 2,903,785 | 9/1959 | Hanink et al. | 29—156.8 |
| 2,934,480 | 4/1960 | Slomin | 204—37 |
| 2,944,500 | 7/1960 | Raynes | 72—342 |
| 3,094,160 | 6/1963 | Walton et al. | 73—342 |
| 3,350,913 | 11/1967 | Bergholdt et al. | 72—342 |
| 1,380,250 | 5/1921 | Reymond | 72—342 |
| 1,725,465 | 8/1929 | Manson | 219—10.41 |
| 1,904,920 | 4/1933 | Hothersall | 72—350 |
| 2,178,032 | 10/1939 | Clausen | 219—149 |
| 2,247,979 | 7/1941 | Von Tannenberg | 219—7.5 |
| 2,393,130 | 1/1946 | Toulmin | 219—149 |
| 2,439,246 | 4/1948 | Gibian | 219—7.5 |
| 2,449,365 | 9/1948 | Bober et al. | 219—7.5 |
| 2,648,759 | 8/1953 | Machian et al. | 219—7.5 |
| 2,890,324 | 6/1959 | Havlik | 219—149 |
| 3,015,292 | 1/1962 | Bridwell | 72—342 |
| 3,025,905 | 3/1962 | Haerr | 72—342 |
| 2,900,715 | 8/1959 | Milnes | 72—38 |

CHARLES W. LANHAM, Primary Examiner

E. M. COMBS, Assistant Examiner

U.S. Cl. X.R.

72—364